United States Patent
Closmann et al.

[11] 3,804,172
[45] Apr. 16, 1974

[54] METHOD FOR THE RECOVERY OF OIL FROM OIL SHALE

[75] Inventors: Philip J. Closmann; George O. Suman, Jr., both of Houston, Tex.

[73] Assignee: Shell Oil Company, Houston, Tex.

[22] Filed: Oct. 11, 1972

[21] Appl. No.: 296,729

[52] U.S. Cl. ................................ 166/272, 166/303
[51] Int. Cl. ............................................ E21b 43/24
[58] Field of Search ............ 166/272, 276, 278, 302, 166/303, 306

[56] References Cited
UNITED STATES PATENTS

| | | |
|---|---|---|
| 3,537,528 | 11/1970 | Herce et al. ..................... 166/272 X |
| 3,501,201 | 3/1970 | Closmann et al. ............... 166/272 X |
| 3,739,851 | 6/1973 | Beard ............................... 166/272 X |
| 3,513,914 | 5/1970 | Vogel ............................... 166/272 X |
| 3,559,736 | 2/1971 | Bombardieri .................... 166/278 X |
| 3,362,475 | 1/1968 | Huitt et al ........................ 166/278 |

Primary Examiner—Stephen J. Novosad
Attorney, Agent, or Firm—H. W. Coryell

[57] ABSTRACT

Shale oil is recovered by forming a subterranean cavern that contacts an oil shale, packing the cavern with solid granules and removing organic and inorganic solids from the oil shale by circulating fluid from a surface location, into contact with the oil shale, through a mass of packed granules, and back to a surface location.

5 Claims, 3 Drawing Figures

PATENTED APR 16 1974  3,804,172
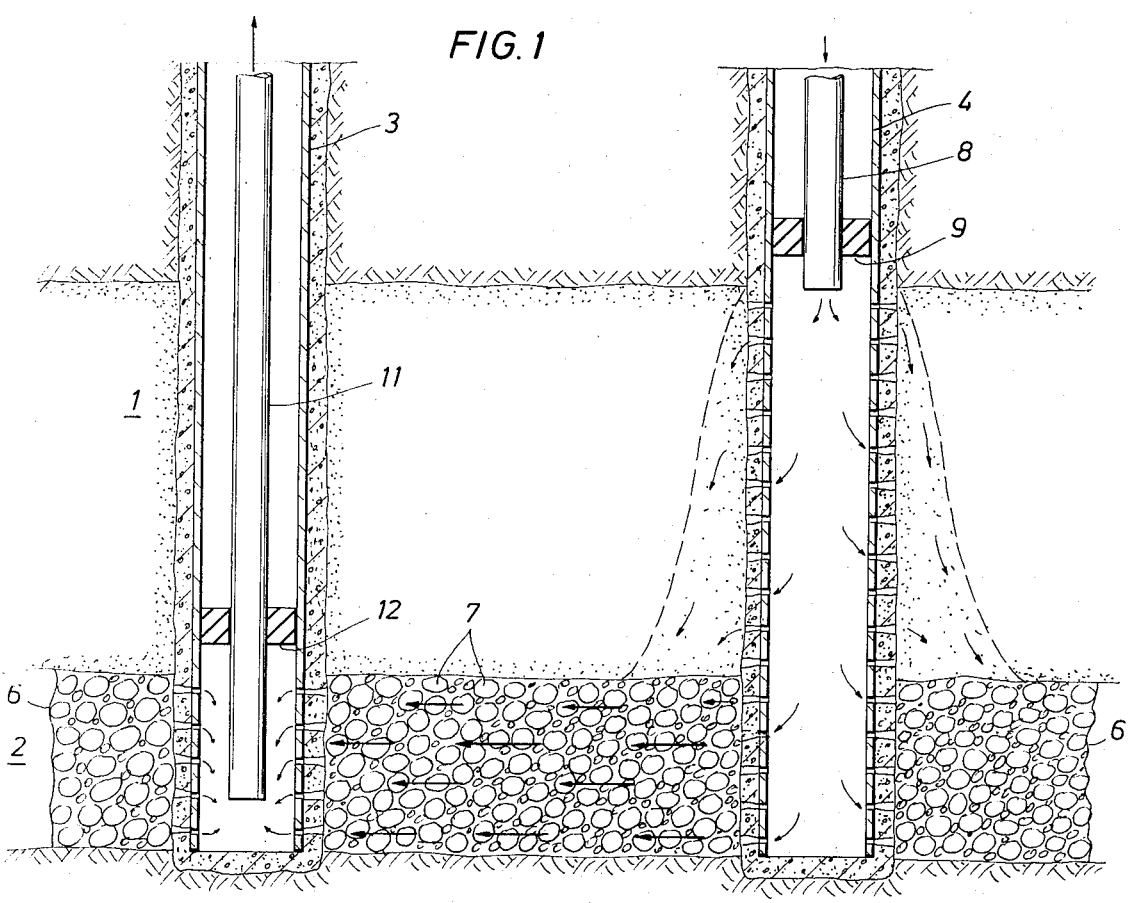
FIG. 1
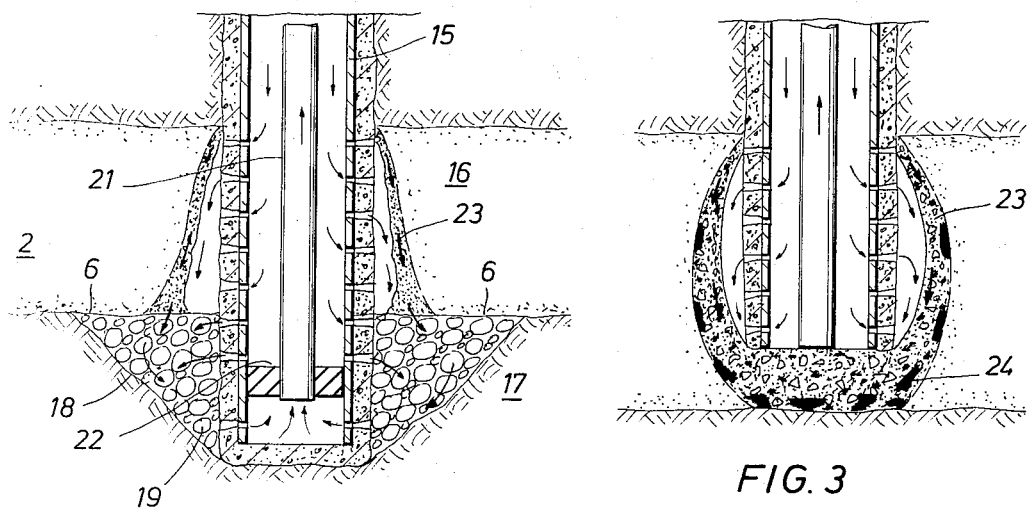
FIG. 2
FIG. 3
(PRIOR ART)

METHOD FOR THE RECOVERY OF OIL FROM OIL SHALE

BACKGROUND

This invention relates to producing shale oil hydrocarbons from a subterranean oil shale formation. More particularly, it relates to removing both organic and inorganic solids from an oil shale by circulating a hot fluid into and out of contact with the oil shale in a manner that fluidizes the solid materials while inhibiting the plugging of the conduits through which the fluid is outflowed.

Many subterranean oil shale formations are nonporous solid earth formations that are impermeable and contain more inorganic solid material than organic solid material. When the organic solids are removed from a subterranean oil shale that has been fracture-permeated to permit the circulation of a hot fluid for pyrolyzing and/or extracting the oil shale organic solids, the remaining mass of fluid-surrounded inorganic solids tends to be bulkier than the original oil shale, because the remaining mass is thermally expanded and is more porous, so that a greater volume is occupied by fluid. Such an increase in bulk volume tends to cause the oil shale-permeating fractures to become plugged and/or cause the surface above the fractures to be raised, if the fractures are kept open by hydraulically lifting the earth formations above the fractures.

Where a subterranean oil shale contains or is interbedded with water soluble minerals, such as nahcolite, trona, soluble halides, or the like, those materials can be used to form a subterranean cavern that contacts the oil shale. Such a cavern can be formed by solution-mining, and used to provide both a path through which a hot fluid can be circulated to fluidize and recover the organic components and to provide a space that accommodates the increased bulk of the residual inorganic components. However, such a shale oil recovery process has the disadvantage of postponing the oil production pending a relatively long and expensive cavern-forming operation that provides a cavern big enough to accommodate significantly large mass of the residual inorganic solids.

Where a subterranean oil shale contains or is interbedded with heat-sensitive carbonate materials, such as nahcolite, dawsonite, or the like, a thermal conversion of those materials can be utilized to reduce the size of a subterranean cavern that will be needed to accommodate the inorganic solid components of the depleted oil shale. In such a procedure, the fluid which is circulated into contact with the oil shale to extract organic components, is a hot aqueous fluid, such as steam, that is adapted to both pyrolyze the oil shale kerogen and to form aqueous solutions containing dissolved and/or entrained inorganic materials removed from the oil shale. This reduces the bulk volume of the spent shale residue by removing inorganic solid material. In such a procedure the rate of the cavern fillup (with depeleted oil shale components) may even be less than the rate of oil shale solid removal so that the cavern expands faster than its interior is filled.

However it has now been found that problems may be encountered when a hot aqueous fluid (such as steam) is circulated within a well so that it contacts the wall of the borehole near the top of the oil shale (for example, at a temperature above about 500° F, which is sufficient to cause a relatively rapid pyrolysis of the oil shale kerogen and heat-decomposition of heat-sensitive carbonate as well as a dissolving of inorganic solid materials). If aqueous and organic liquids are produced from a lower level within the well or cavern, the conduits through which they are produced may be rather quickly and severely plugged.

SUMMARY OF THE INVENTION

This invention relates to an oil shale recovery process using a combination of steps. A cavity or cavern is formed so that it contacts a subterranean oil shale that contains heat-sensitive carbonate mineral. A conduit for recovering fluid from the cavity is positioned to have an inlet in a lower portion of the cavity. The cavity is packed with a porous mass of solid granules, at least in the vicinity of the inlet to the conduit. Both organic and inorganic solid material are removed from the oil shale by circulating a hot, aqueous fluid from a surface location, into contact with the oil shale, through the mass of packed granules, and back to a surface location. Gaseous and/or liquid hydrocarbons and/or other shale oil petroleum materials and, if desired, inorganic byproducts, are recovered from portions of the fluid circulated back to a surface location.

The present invention is, at least in part, premised on a discovery relative to the behavior of a slurry of finely-divided organic and inorganic solid particles that forms when an oil shale that contains heat-sensitive carbonate material is contacted with a hot aqueous fluid. The so-contacted oil shale tends to be disaggregated into a relatively dense slurry of fine, generally silt-sized, or smaller, solid particles. Such a fines-slurry has a specific gravity significantly greater than the hot oil, the shale-contacting aqueous fluid and/or the gaseous or liquid oil shale pyrolysis products and tends to flow as a "turbidity current" toward and along the bottom of any chamber or cavity in which such fluids are confined. The particles in such a fines-slurry include granules of: kerogen, hard and soft bitumen, semi-solid hydrocarbons or hydrocarbon derivatives, undissolved inorganic solids, and the like. The particles or granules are suspended in a mixture of oil-phase liquids and aqueous solutions of dissolved inorganic materials. Such fines-slurry tend to solidify when they are allowed to cool or become quiescent.

During the circulation of a stream of hot aqueous oil shale-contacting fluid within a well, such a fines-slurry tends to remain intact and flow as a turbidity current toward and along the bottom of the well and/or any surrounding cavity. Such a flow behavior isolates many of the solid particles in the slurry from contact with fresh, unsaturated portions of the oil shale-contacting fluid that flows past the turbidity current. Since the circulating oil shale-contacting fluid is continually forming more of the fines-slurry (from newly contacted portions of the oil shale) the volume of the slurry tends to increase until it enters and plugs the conduits through which the circulating oil shale-contacting fluid is being recovered.

It has now been found that when a stream of circulating oil shale-contacting hot aqueous fluid and separately co-flowing fines slurry is forced to flow through a relatively highly porous and immobile mass of granules, the components of the fines-slurry are spread along the surfaces of the granules so that the suspended fines are contacted by relatively large portions of the circulating oil shale-contacting fluid. This materially increases the rate at which the solids suspended in the fines-slurry are pyrolyzed (and thus thermally converted to mobile fluids) or are dissolved in the circulating aqueous liquid. Such a fluidization reduces the solids content of the fines-slurry and thus reduces both the viscosity of the slurry and the tendency for the slurry to plug a fluid passageway. Although the fines that are not pyrolyzed or dissolved tend to be screened-out of the fines-slurry and piled up along the outside of the pack, such fines are only a fraction of the total amount and the pack radius, and thus, the effective radius of the producing well is materially increased by the presence of the mass or pack of granules.

DESCRIPTION OF THE DRAWING

FIGS. 1 and 2 are schematic illustrations of portions of subterranean oil shale formations in which the process of the present invention is being employed.

FIG. 3 is a schematic illustration of a similar oil shale in which a prior art process is being employed.

DESCRIPTION OF THE INVENTION

As used herein, the term "cavern" or "cavity" is used to refer to any relatively solids-free opening such as a cave, void, tunnel, borehole, or highly permeable mass of rubble or interconnected fractures, etc. Such a cavern "contacts an oil shale" when a portion of the oil shale forms at least a portion of the wall of the cavern so that there is fluid communication between the interior of the cavern and the oil shale. The term "heat-sensitive carbonate mineral" refers to a carbonate mineral that decomposes relatively rapidly at a relatively low temperature, such as between about 250° and 700° F, to yield fluid products such as carbon dioxide and water. Examples of heat sensitive carbonate minerals include nahcolite, dawsonite, trona, and the like, which usually contain saline carbonate and/or bicarbonate compounds or groups. The term "packing granules" refers to relatively large balls or pieces of rock or other substantially inert, solid material, that are small enough to be transported through well conduits into a subterranean location but are large enough and near-enough spherically shaped to form a mass of packed granules within a subterranean cavern or cavity that is substantially rigid and highly permeable, but presents a large surface area and many and diverse passageways, through the interstices between the pack granules.

FIG. 1 shows the application of the present process to a subterranean oil shale formation 1, which is interbedded with a horizontally extensive layer of water-soluble mineral, such as nahcolite layer 2. The oil shale, to which the present process is applied, is preferably one that contains a significant amount of heat-sensitive carbonate. Such an oil shale may contain sections of vertical intervals of as much as several tens of feet thick, which are substantially devoid of heat-sensitive and/or water soluble materials. In such a heterogeneous oil shale formation, in the course of the application of the present process, such heat-sensitive or soluble minerals are converted to fluids and/or dissolved and removed so that portions of the oil shale become incompetent and form factures that provide passageways for the circulation of fluid.

In a preferred embodiment of the present invention, a borehole is extended into a relatively low-lying portion of oil shale that contains or is adjacent to a layer or region that is relatively rich in water soluble minerals. Water-soluble minerals, which are generally saline minerals, are frequently encountered in oil shales in the United States, such as the Green River formation in Colorado, in the form of beds, lenses, nodules, nodes, veins or the like. Such minerals include the alkali metal halide salts such as the sodium or potassium chlorides and/or water soluble heat-sensitive carbonate minerals such as nahcolite, trona, or the like.

Portions of subterranean oil shale that contain mineral components such as heat-sensitive carbonate minerals and/or water soluble minerals, can be located by means of known geological investigation procedures and equipment. Such procedures are preferably utilized to locate a portion of an oil shale that contains heat-sensitive carbonate mineral and is adjacent to a portion or layer of water-soluble mineral. The water-soluble mineral is utilized to form a cavern or cavity in contact, for example, along its roof, with the oil shale. The cavern formation can readily be accomplished by means of known solution or mechanical mining, hydraulic and/or explosive fracturing, slurry mining or the like techniques and equipment that are currently available.

Wells 3 and 4 are drilled and completed in horizontally-spaced locations within the oil shale. Their spacing is preferably close enough to facilitate their interconnection by forming and propagating fractures through or along the boundaries of the nahcolite layer 2. The nahcolite layer, or at least the upper portion of it, can be solution-mined by circulating an aqueous fluid, which can advantageously be warmed or made acidic, between the wells. The mining forms a cavern or cavity 6 extending into a fluid-communicative contact with the wells 3 and 4 and the oil shale 1. The wells are preferably initially completed by installing and cementing casings and perforating them only along the sections adjacent to the cavity. As known to those skilled in the art, by reversing the flow direction of the solution mining fluid and varying the injection and production pressures, and the like, the cavity 6 can be provided with a significant areal extent. The cavity is packed with relatively large-sized packing granules 7. Various techniques and flow patterns can be used. Preferably at least a portion of the packing granules are slurried in a relatively viscous carrying liquid, such as a thickened aqueous or oil-phase liquid, and pumped in through well 4 so that the granules are transported through cavity 6 until they are screened out at well 3 against a permeable structure such as perforated casing, well liner, screen, or the like. This ensures the formation of a mass of packing granules in immediate vicinity of the inlet to the conduit through which the granule-carrying fluid is circulating back toward a surface location.

After the cavity 6 has been formed and packed, the well 4 is preferably opened along substantially all of the oil shale interval, for example, by perforating a well casing. As known to those skilled in the art, in certain situations, a "barefoot" completion can be utilized. Well 4 is preferably equipped with a fluid inflow conduit arrangement, such as tubing string 8 and packer 9, to facilitate an in-flow of a hot aqueous fluid, such as steam, from a surface location into contact with the oil shale 1.

The oil shale-containing hot aqueous liquid used in this invention can comprise superheated, dry, or wet, steam or a mixture of steam or substantially any gas, vapor or liquid, such as carbon dioxide, phenols, hydrocarbons, alcohols, halogenated hydrocarbons, acids, or the like, or substantially any hot aqueous liquid solution, such as an aqueous acid or base or solution of neutral salt. The in-flowing hot aqueous fluid can be heated by means of surface located and/or downhole located heaters, such as steam generators, water heaters, or the like. The heating can be effected or supplemented by an in situ combustion within the oil shale formation. The temperature of the in-flowing hot aqueous fluid can suitably range from about 250° F to a temperature sufficient to cause a relatively rapid oil shale pyrolysis e.g., from about 600°–1,000° F, as long as sufficient aqueous liquid is present, or is formed by steam condensation, to dissolve a significant portion of inorganic solid material.

Well 3 is equipped with a conduit, for returning the circulating fluid to a surface location, such as tubing 11 and packer 12. The fluid-return, or production, conduit is preferably arranged to provide an inlet below the top of and in fluid communication with the granule-packed cavity 6.

Organic and inorganic solid materials are removed from the oil shale by circulating a hot aqueous fluid from a surface location into contact with the oil shale, through the mass of packing granules 7, and back to a surface location. The rate at which the circulating fluid is flowed through the mass of packing granules is preferably high enough to create within the mass of granules a relatively uniform flow that tends to override the effect of gravity segregation.

As indicated in FIG. 2, a generally similar production operation can be applied through a single well. Well 15 is opened into an oil shale 16 overlying a nahcolite layer 17. A cavity 18 is formed, within the nahcolite layer in contact with the oil shale, and is packed with granules 19. The well is equipped with production tubing 21, and packer 22, in an arrangement such that steam can be injected into contact with the oil shale and forced to flow through a portion of the packing granules 19 before being circulated back to the surface location through conduit 21.

Where steam is the fluid that contacts the oil shale the steam-heating thermally fluidizes some organic and inorganic components while steam is condensing into an aqueous liquid that dissolves solid components from the oil shale. This heating and dissolving disaggregates the oil shale solids to form a dense slurry of fines 23 that has a specific gravity significantly greater than any of the other fluids within the well and flows it as a turbidity current down along the borehole walls and into the pack of granules 19. Within pack granules the slurry is broken up and spread along the surfaces of the granules, due to the relatively high velocities at which the fluids flow through the small passageways between the granules. This exposes the average fine particle in the slurry of fines to many volumes of the hot aqueous liquid relative to the number of such volumes that would contact the average particle in a slurry of fines that was flowing as a turbidity current. With the higher volume contact, substantially all of the soluble inorganic and pyrolyzable organic particles are relatively rapidly fluidized by thermal conversion, and/or dissolution.

FIG. 3 shows production problems that may be encountered if the process shown in FIG. 2 were to be applied with a well arrangement that is similar to that of FIG. 2; with the exception of the formation and packing of the cavity 18. The disaggregation of the oil shale produces the fines slurry 23 that flows as a turbidity current toward the bottom of the well. The volume of the potentially plugging, high density, fines slurry is increased by the sloughing-off of lumps and fragments of oil shale 24, that are transported by gravity and drag of the fluid-flow toward the bottom of the well and toward the inlet to the conduit through which fluids are returned toward a surface location.

Field experience indicated that plugging is a severe problem when the fluid circulating arrangement is equivalent to that shown in FIG. 3 and the fluid being circulated is steam at about 525° F. Note that in the arrangement shown in FIG. 2, such a sloughing-off of oil shale lumps 24, is inhibited by the mechanical supporting action of the mass of packing granules.

What is claimed is:

1. A shale oil recovery process which comprises:
   forming a subterranean cavity in contact with a subterranean oil shale that contains heat-sensitive carbonate mineral;
   positioning a conduit for outflowing fluid from an inlet location below the top of and in fluid communication with the cavity;
   packing the cavity with a porous mass of solid granules at least in the vicinity of the fluid inlet by pumping in a slurry of granules composed of substantially inert materials that become packed into a fluid permeable mass that is substantially rigid;
   removing organic and inorganic solid materials from the oil shale by circulating hot aqueous fluid from a surface location, into contact with the oil shale, through said permeable mass of granules, and back to a surface location; and
   recovering shale oil hydrocarbon materials from the fluid returning to a surface location.

2. A process according to claim 1 in which the circulated hot aqueous fluid is steam.

3. A process according to claim 1 in which the subterranean cavity is formed by leaching out at least the upper portion of a substantially water-soluble layer within or overlain by the oil shale.

4. A process according to claim 1 in which the subterranean cavity is formed so that it extends into fluid communication with a pair of wells.

5. The process according to claim 4 in which the hot aqueous fluid is circulated from a surface location, into contact with the oil shale around one of the pair of wells, through the porous mass of granules in the cavity, and back toward a surface location through the other well of the pair.

* * * * *